US010909383B2

United States Patent
Harris et al.

(10) Patent No.: US 10,909,383 B2
(45) Date of Patent: *Feb. 2, 2021

(54) PREDICTING FUTURE INSERTION ZONE METADATA

(71) Applicant: Mirriad Advertising PLC, London (GB)

(72) Inventors: Tim Harris, London (GB); Philip McLauchlan, London (GB); David Ok, London (GB)

(73) Assignee: Mirriad Advertising PLC, London (GB)

(*) Notice: Subject to any disclaimer, the term of this patent is extended or adjusted under 35 U.S.C. 154(b) by 0 days.

This patent is subject to a terminal disclaimer.

(21) Appl. No.: 16/814,802

(22) Filed: Mar. 10, 2020

(65) Prior Publication Data

US 2020/0210713 A1 Jul. 2, 2020

Related U.S. Application Data

(63) Continuation of application No. 15/928,937, filed on Mar. 22, 2018, now Pat. No. 10,592,752.

(30) Foreign Application Priority Data

Mar. 24, 2017 (EP) .................................. 17162862

(51) Int. Cl.
*G06K 9/00* (2006.01)
*G06N 5/02* (2006.01)
(Continued)

(52) U.S. Cl.
CPC ........... *G06K 9/00765* (2013.01); *G06N 5/02* (2013.01); *H04N 21/233* (2013.01);
(Continued)

(58) Field of Classification Search
None
See application file for complete search history.

(56) References Cited

U.S. PATENT DOCUMENTS

2011/0075992 A1 3/2011 Mei et al.
2011/0188836 A1 8/2011 Popkiewicz et al.
(Continued)

OTHER PUBLICATIONS

European Search Report issued in related Patent Application No. EP-17162862, dated Aug. 31, 2017.

*Primary Examiner* — Heather R Jones
(74) *Attorney, Agent, or Firm* — Maschoff Brennan

(57) ABSTRACT

Aspects of the present disclosure aim to improve upon methods and systems for the incorporation of additional material into source video data. In particular, the method of the present disclosure may use a pre-existing corpus of source video data to produce, test and refine a prediction model for enabling the prediction of the characteristics of placement opportunities. The model may be created using video analysis techniques which obtain metadata regarding placement opportunities and also through the identification of categorical characteristics relating to the source video which may be provided as metadata with the source video, or obtaining through image processing techniques described below. Using the model, the method and system may then be used to create a prediction of insertion zone characteristics for projects for which source video is not yet available, but for which information corresponding to the identified categorical characteristics is known.

20 Claims, 3 Drawing Sheets

(51) Int. Cl.
*H04N 21/25* (2011.01)
*H04N 21/233* (2011.01)
*H04N 21/234* (2011.01)
*H04N 21/258* (2011.01)
*G11B 27/02* (2006.01)
*H04N 21/466* (2011.01)
*H04N 21/81* (2011.01)

(52) U.S. Cl.
CPC ..... *H04N 21/23418* (2013.01); *H04N 21/251* (2013.01); *H04N 21/25891* (2013.01); *G11B 27/02* (2013.01); *H04N 21/23412* (2013.01); *H04N 21/4663* (2013.01); *H04N 21/4666* (2013.01); *H04N 21/812* (2013.01)

(56) References Cited

U.S. PATENT DOCUMENTS

2016/0050465 A1\* 2/2016 Zaheer ............... H04N 21/6581
725/34
2018/0276479 A1 9/2018 Harris et al.

\* cited by examiner

PREDICTING FUTURE INSERTION ZONE METADATA

CROSS-REFERENCE TO RELATED APPLICATION

This application is a continuation of U.S. patent application Ser. No. 15/928,937, filed on Mar. 22, 2018, which claims priority to European Patent Application No. 17162862.1, filed on Mar. 24, 2017, the disclosures of each of which are hereby incorporated herein by this reference in their entireties.

TECHNICAL FIELD

The present disclosure relates to a method and system for predicting the existence and characteristics of video placement opportunities.

BACKGROUND

With the advent of digital file processing, it is possible to digitally insert objects into a video. In order to digitally insert an object into a video first an opportunity for digital object insertion must be identified. That opportunity must then be evaluated to determine the value or benefit of digitally inserting the object. If it is decided that there is sufficient benefit or value in inserting the digital object into the video, the process of digital object insertion may then begin.

Digitally inserting objects in a video may have many benefits, for example enhancing the visual effects of the video, or improving the realism of a video, or allowing more flexibility for the video after it is shot, meaning that fewer decisions need to be made regarding objects to include in scene at the stage of filming the scenes. Consequently, digital object insertion is becoming increasingly common and utilised by video makers for all manner of purposes.

However, identifying potential opportunities for digital object insert and then evaluating them is typically a time consuming and labour intensive process. Where the identification and evaluation is performed manually by a human, it can be very time consuming and human resource intensive. Where the identification and evaluation is performed by software, the computational overheads can be significant and require substantial computing resources. Some videos may have very few, if any, opportunities for sufficiently beneficial or valuable digital object insertion, but this can only be determined after carrying out the time consuming process of identification and evaluation. As digital object insertion becomes increasingly common, existing analysis and evaluation technique have an increasing detrimental effect on resource efficiency, particularly for videos of significant length, such as films or episodes/shows of television programs.

In order to explain the stages of analysis and evaluation, it is first helpful to define some terminology that may help with understanding the process. The video may comprise a series of 'shots'. The shots may be delineated by cuts, where the camera stops recording, or where the video material is edited to give this impression. In a first step, opportunities for digital object insertion may be identified. This is often referred to as a pre-analysis pass and may be best done by identifying scenes within the video, particularly scenes shot from the same camera position. It has been known for many years how to segment a video into scenes automatically, using shot change detection. This pre-analysis may include many other processes, and may result in a sorting process where all similar shots, or shots of the same locale, are presented together. Similar shots, or shots from the same locale, where insertion opportunities are relevant and presented together are sometimes referred to as an 'Embed Sequence'. Humans are typically good at identifying 'good' opportunities for digital object insertion by manual analysis. For example a jar of instant coffee may suit a kitchen scene, but the coffee jar would look out of place in a bathroom scene, or in an outdoor desert scene. By way of example, it may be decided that a kitchen worktop in a scene is good for the digital insertion of grocery products. However, analysing videos in this way, particularly long videos, may be time consuming and if few, or no, object insertion opportunities are identified, that time may be a waste of resources.

In order then to evaluate identified opportunities, it may be important to note how long the camera spends looking at the identified location for digital object insertion, for example, the kitchen worktop. For example, if it is only a fleeting shot, it is not likely that the scene represents a good opportunity for digital object insertion. On the other hand, if the scene in the kitchen is long, and the area that is suitable for object insertion is in view for this duration, it is likely that there may be significant benefit to digitally inserting an object there. Similarly, as part of the evaluation, it may also be important to determine how many times that scene is in the video. For obvious reasons, it is important to keep a temporal consistency, of having the same item in the same position every time that scene is occurs in the video.

It may be desirable to create mock ups of the digital object opportunities by rendering preview imagery (often at a lower than final resolution) which has a blue box or cylinder in the imagery to represent the (as yet unspecified) objection to be placed. This may assist in further assessing the value of the opportunity for digital object insertion, by allowing the positioning of the digitally inserted object to be visualised. It may also be desirable to create an evaluation report on the potential opportunity, listing how much total time over how many scenes the digitally inserted object can be seen. It is important to realise that the video may be part of a series of videos (for example, the video may be one episode, or show, in a series, or season, of a television programs), meaning that the same scenes, locales, and characters may reappear in each episode or show. In such a situation, the evaluation may span some or all of the episodes/shows in the series/season, as the true value of digital object insertion may be best appreciated across the multiple episodes/shows.

There may be many reasons for digitally inserting objects into videos, and many contexts in which it may be desired. In some instances, it may be desirable in order to enhance visual effects. In other instances, it may be desirable in order to include additional items in the video that were not contemplated at the time of recording the video. In other instances, particular products may be inserted in order to function as a form of advertising. Regardless of context or purpose, there may be value and/or a number of benefits in digitally inserting objects into videos, but the process of identification and evaluation is technically complex and demanding and can be an inefficient use of resources if an insufficient number of valuable/beneficial digital object insertion opportunities are identified.

SUMMARY

Aspects of the present disclosure aim to improve upon methods and systems for the processing of video leading to incorporation of additional material into the video (including the evaluation of video prior to and/or post the insertion of additional material). In particular, in one aspect of the present disclosure, a pre-existing corpus of source video data is used to produce, test and refine a prediction model for enabling the prediction of the characteristics of placement opportunities. The prediction model is created using video analysis techniques which obtain metadata regarding placement opportunities (referred to throughout this disclosure as "Insertion Zones"), and through the additional identification of categorical characteristics relating to the source video which may be provided as metadata with the source video, or obtaining through image processing techniques described below. Using the prediction model, the method and system may then be used to create a prediction of insertion zone characteristics for projects for which source video is not yet available, but for which information corresponding to the identified categorical characteristics is known. Once the prediction of the characteristics of future insertion zone (i.e. the insertion zone metadata relating which defines its properties) is known, a quality score may be generated for placement opportunities for individual portions of video, or even new series of videos, and this can be provided to a client user platform in dependence on the characteristics of a client user profile matching the predicted future insertion zone characteristics.

According to a first aspect of the present disclosure, there is provided a computer implemented method for determining insertion zone metadata of a new video, the method comprising: obtaining categorical metadata relating to the new video, the categorical metadata comprising at least one categorical variable; obtaining, for each of the at least one categorical variable, an associated insertion value; and determining the insertion zone metadata of the new video based at least in part on the at least one insertion value, wherein the insertion zone metadata of the new video comprises at least one predicted value of at least one corresponding insertion zone characteristic for the new video.

The insertion value may, for example, be a quantity, or number, or measure, or may be indicative of a quantity, or number, or measure (for example, it may be something that is associated with a particular numerical value, such as a pointer to a particular numerical value) that can be used to determine at least one predicted value of at least one corresponding insertion zone characteristic. For example, it may define a correlation between the at least one categorical variable and one or more insertion zone characteristic relating to source video, such that a predicated value(s) for the one or more insertion zone characteristics can be determined from the insertion value.

The predicted value of at least one corresponding insertion zone characteristic may be any suitable magnitude, quantity or number that can describe or define the size or importance or scale of an insertion zone characteristic. For example, the predicted value may be a measure of time, such as number of seconds, for an insertion zone characteristic such as duration of insertion zone, or it may be a measure of size, such as size in $mm^2$, or $cm^2$, or percentage of frame size, etc for an image frame, etc, etc.

Obtaining the insertion value may comprise digitally analysing source video to obtain source video insertion zone metadata, the source video insertion zone metadata comprising at least one value of a corresponding insertion zone characteristic for the source video.

Preferably, digitally analysing source video comprises analysing a plurality of instances of source video, each instance of source video having at least one categorical variable in common. The categorical variable(s) that the two or more source videos all have in common may be one or more of the categorical variables of the new video. For example, the new video may be for a new series of episodes of a program (Program A) to be directed by a particular director (Director X). The categorical metadata of the new video may therefore comprise a categorical variables "Program: Program A" and "Director: Director X". The two or more source videos may therefore all have the categorical variable "Program: Program A" and/or "Director: Director X".

The method may further comprise creating a prediction function for a categorical variable, the prediction function being dependent on the at least one value of an insertion zone characteristic obtained for the source video, and the prediction function providing one or insertion values for a categorical variable.

The method may further comprise determining a Video Impact Score based on the at least one predicted value of the at least one corresponding insertion zone characteristic for the new video.

The value of an insertion zone characteristic may be estimated using a Gaussian process regression technique.

The categorical variable may relate to one or more of: video content type; video content length; video content producer; video content personnel; age of video content; intended audience; geographical distribution; intended distribution channels (for example, TV broadcast and/or digital online); advertising data (for example, sponsorship, product placement and advertising breaks, pre-roll, mid-roll, post-roll); third-party analysis (for example, social network response); and/or video content production time.

The one or more insertion zone characteristics may relate to at least one of: insertion zone position; insertion zone size; insertion zone duration; insertion zone locale; insertion zone character interactivity; insertion zone attentional value; insertion zone proximity; insertion zone orientation; insertion zone blur; insertion zone hero status; and/or insertion zone repetition.

Obtaining an insertion value may comprise applying machine learning, for example applying a Gaussian Process regression technical or Bayesian mixture models, or a combination of both.

Determining insertion zone metadata may be further based on client user preference data.

Obtaining an insertion value associated with a categorical variable may comprise identifying a categorical variable present in source video, utilising one or more of: facial recognition technology, optical character recognition, convolutional neural network processing, computer vision techniques, reading in media metadata from the source video or an external database, or manual annotation.

The method may further comprise determining a correlation between predicted values of insertion zone metadata and one or more client user profiles, the client user profiles comprising preferred values for insertion zone characteristics, and communicating the predicted insertion zone metadata information to a client user having preferred values for insertion zone characteristics which correlate to the predicted values of insertion zone characteristics.

In a further aspect of the present disclosure, there is provided a non-transitory computer-readable medium having computer executable instructions stored thereon, which when executed by a computing device cause the computing device to perform the method identified above.

In a further aspect of the present disclosure, there is provided an electronic device (for example, a desktop computer, or a server, or a mobile electronic device such as a smartphone, or tablet computer, or laptop computer) configured to perform the method identified above.

In a further aspect, there is provided a system (for example, a plurality of interconnected entities, modules or device, which may be co-located or located in different geographical places) for determining insertion zone metadata of a new video, the system comprising: one or more processors; and one or more memory modules, wherein the memory modules are configured to store computer executable instructions, which when executed on the one or more processors cause the system to: obtain categorical metadata relating to the new video, the categorical metadata comprising at least one categorical variable; obtain, for each of the at least one categorical variable, an associated insertion value; and determine the insertion zone metadata of the new video based at least in part on the at least one insertion value, wherein the insertion zone metadata of the new video comprises at least one predicted value of at least one corresponding insertion zone characteristic for the new video.

BRIEF DESCRIPTION OF THE DRAWINGS

Further features and advantages of the present disclosure will become apparent from the following description of an embodiment thereof, presented by way of example only, and by reference to the drawings, wherein like reference numerals refer to like parts, and wherein.

DESCRIPTION OF THE ASPECTS

Figure 1:
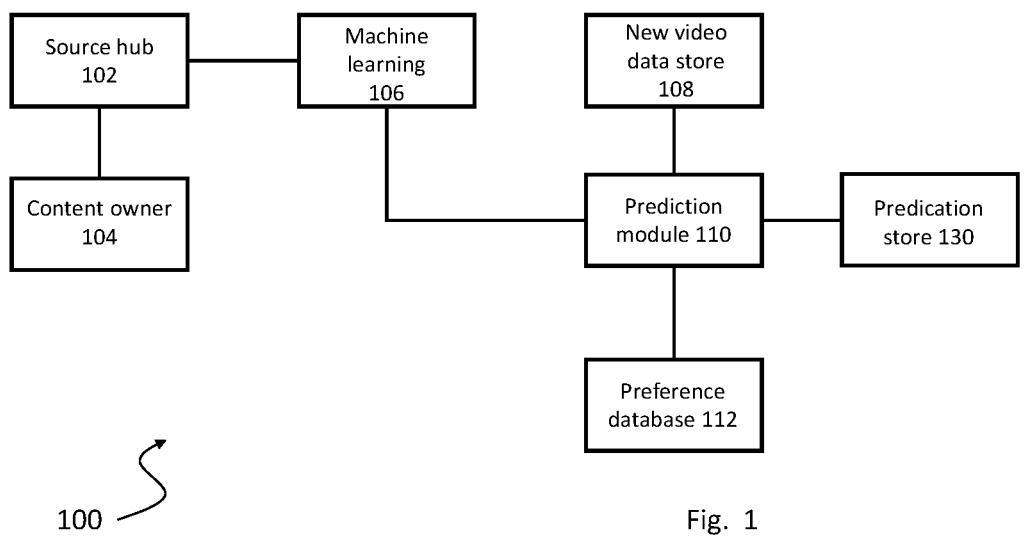
FIG. 1 is a schematic diagram showing a system in accordance with aspects of the present disclosure.

The present disclosure relates to the determination of insertion zone metadata of a new video using categorical metadata (comprising at least one categorical variable, such as video content producer, video content length, etc) relating to the new video. In this way, even where the new video is not yet available for detailed analysis (for example, because it is merely in the form of a script and has not yet been shot), a prediction of insertion zone metadata may be made for the new video. The insertion zone metadata may therefore provide a quick measure of potential for object insertion in the new video (for example, it may be determined how many potential digital object insertion zone opportunities there might be in the new video and/or the length of insertion zone opportunities and/or the quality of insertion zone opportunities, etc). Consequently, detailed evaluation/analysis of videos for digital object insertion opportunities may be restricted to videos with sufficient potential to justify the computing resources of detailed evaluation/analysis, thereby improving computational efficiency.

In issued U.S. Pat. No. 9,294,822 B2, belonging to the present applicant, a "remote access online catalogue which contains one or more metrics that are useable to automatically calculate the monetary value of a placement of a digital advertising component, wherein metrics and the monetary value are determined before the digital advertising placement" is described. The document also goes on to say "one or more metrics related to the video material comprise at least one of a length of selected parts of the video material which are suitable for placement of digital advertising components, a size of placement zone, a duration of the video material, a predicted audience size, a predicted audience demographic, an number of placement zones, a total time of the placement zones within the video material, an average placement zone length, and an average episode placement zone length". Techniques are described that may be used on material under consideration for Native In Video Advertising (NIVA) to assess or determine the number of opportunities, by examining each scene or locale in turn.

The present disclosure uses video analytic techniques to predict the properties of advertising placement for material that is not available for analysis. There are several scenarios that give rise to the need for this, which are explained further below.

One aspect of the present disclosure relates to the case where the later episodes of a series are not yet shot. Because they haven't been shot they cannot by analysed. Another scenario may be the commissioning of a new season of a popular show. For example this may be a further season of the popular 'Big Bang Theory' series. A third scenario may be that the material is not accessible to be analysed. Either it is not possible to send the physical carrier material (disc packs, tapes etc.) to the place where assessment takes place, or there are security or contractual reasons why the material cannot be passed over for assessment.

FIG. 1 is a schematic diagram showing an example video processing system 100 in accordance with aspects of the present disclosure. The subsystems of the video processing system may be coupled via one or more data communication networks (not shown). In some aspects, the subsystems may be coupled to each other via the Internet.

Subsystem 102, which is referred to herein as the "source" hub, performs amongst other things, video data analysis in the video processing system 100. The source hub 102 may retrieve source video data as one or more digital files, supplied, for example, on digital or analog video or data tape, on digital versatile disc (DVD), over a high-speed computer network, via the internet, on one or more removable disc drives or in other ways. In one example, the source video data is provided by a distributor. In another example, the source video data is provided by a content owner 104.

The source video data comprises frames of video material. Contiguous frames of video material set in one location are known as shots. The source hub 102 may comprise a video data analysis module, which performs pre-analysis in relation to source video data. Such analysis may be performed using appropriate software which allows objects to be placed digitally into existing video material. The pre-analysis may be fully automated in that it does not involve any human intervention.

The video data analysis module may be used to perform a pre-analysis pass in relation to the source video data to identify one or more shots in the source video data. This may involve using shot detection and/or continuity detection which will now be described in more detail.

Pre-analysis may comprise one or more of a shot detection function, a continuity detection function and/or a tracking function, as will be described below.

A shot detection function to identify the boundaries between different shots in video data. For example, the video data analysis module automatically detects "hard" and "soft" cuts between different shots, which correspond to hard and soft transitions respectively. Hard cuts correspond to an abrupt change in visual similarity between two consecutive frames in the video data. Soft cuts correspond to the beginning or the end of a soft transition (for example wipe and cross fading transitions), which are characterised by a significant but gradual change in visual appearance across several frames.

A continuity detection function to identify similar shots (once detected) in video data. This can be used to increase the likelihood that each (similar) shot in a given scene is identified—this may be a benefit in the context of digital object placement, as described above. For example, as discussed, the link between an object to be inserted and the context of the shots which have been identified should be maintained. For each detected shot, a shot similarity algorithm detects automatically visually similar shots within the source video data. The similarity detection may be based on matching between frames, which captures an overall global similarity of background and lighting. It may be used to identify shots which are part of a given scene in order to speed up the process of selecting shots that should be grouped together on the basis that they are similar to each other.

A tracking (such as 2D point tracking) function detects and tracks multiple point features in video data. This involves using a tracking algorithm to detect and track feature points between consecutive frames. Feature points correspond to locations within an image which are characteristic in visual appearance; in other words they exhibit a strong contrast (such as a dark corner on a bright background). A feature is tracked by finding its location in the next frame by comparing the similarity of its neighbouring pixels.

The source hub 102 may analyse the source video data to find regions within the source video data which are suitable for receiving one or more additional video components. The regions within the source video data which are suitable for receiving additional video data are known as insertion zones. The pre-analysis mentioned in the preceding paragraphs allows for the creation of insertion zone metadata which relates to the qualities of the identified insertion zones. The insertion zone metadata includes, but is not limited to, at least one of: the position, size, and duration of the insertion zone, and is described more fully below.

The source hub 102 may be provided with one or more modules for the determination of the properties of the objects to be inserted into the video.

A tracking module, which may be used to determine how the position of a digitally placed object should vary when added into video material, for example to take into account any movement of the camera that recorded the video material. Tracking may be automated and/or may involve human intervention.

A masking module may be used to assess how to handle occlusion (if any) of an object to be digitally placed in video material having regard to other objects that may already be present in the video material. Masking assessment may be automated and/or may involve human intervention.

An appearance modelling module may be used to determine a desired appearance in relation to the digitally placed object, for example using blur, grain, highlight, 3D lighting and other effects. Appearance modelling may be automated and/or may involve human intervention.

These modules all provide further insertion zone metadata which may define the qualities of the insertion zone—it can be recorded, for example, whether an insertion zone is subject to motion blur, occlusion by moving objects, the cost/difficultly of object insertion into the insertion zone, etc., in order that placement opportunities can be ranked as more or less desirable, for example to a potential brand or advertiser wishing to place their product or service in the video.

Machine learning module 106 in system 100 receives the video content from the source hub 102, and derives from the metadata a model of the characteristics of the Insertion Zones found in the source video content and their relationship to characteristics of the video content itself, as is further described in detail below.

New video data store 108 comprises a data store in which categorical metadata relating to a new video, and optionally the new video content itself, is stored. For example, it may be owned and/or operated by an external entity, such as Netflix®, or by an entity that owns and/or operates some or all of the rest of the system 100. New video data store 108 (which is a data store for new video) provides metadata including categorical variables and continuous variables relating to new video content to prediction module 110. The prediction module 110 uses insertion values associated with the categorical variables and optionally the continuous variables that were derived from the source video content analysed by machine learning module 106 and combines these with the categorical metadata relating to the new video content provided from new video data store 108 to derive predictions for the expected characteristics of insertion zones which may be present in the new video content, without being presented with the new video content itself. This is described in further detail below.

In some aspects, having derived predictions for the expected characteristics of insertion opportunities of new video content according to the analytic techniques described below, prediction module 110 may optionally perform a search of a client preference database 112, in which is stored preference data relating to existing or potential clients who may wish to have the opportunity to digitally place an object into a scene or scenes of new video content. The preference data may include, but is not restricted to, at least one of: minimum size of insertion zone, minimum/maximum duration of insertion zone, minimum/maximum frequency of insertion zones, occlusion tolerance values, semantic information relating to the product or brand provided by the client user etc. The prediction module 110 may determine whether there is a match or correlation between the predicted expected characteristics of insertion opportunities in the new video and the stored preference data. In this way, third parties can be made aware of placement opportunities which match their preference criteria stored in the preference database 112, based on obtained categorical variables and corresponding insertion zone characteristics determined for new video as above.

The predictions for expected characteristics of insertion opportunities in the new video may be communicated to a prediction storage module 130, which, for example may be comprise a data base or any other suitable data storage means.

Figure 2:
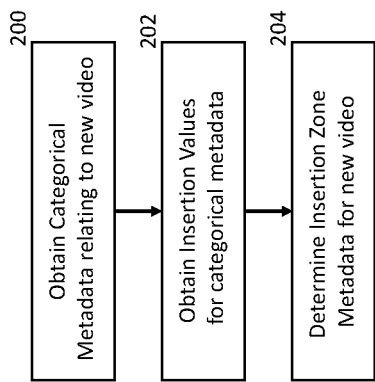
FIG. 2 is a flow chart showing an overview of a process according to the present disclosure.

FIG. 2 shows a high level overview of a process according to the present disclosure. Each of the steps of the process are described in more detail below, but in summary:

In step 200, categorical metadata relating to a new video is obtained by the prediction module 110.

In step 202, insertion values associated with each categorical variable in the categorical metadata each are obtained by the prediction module 110.

In Step 204, insertion zone metadata relating to new video is determined based at least in part on the at least one insertion value. The insertion zone metadata which is determined is a prediction of the nature of insertion zones that may be present in the new video based on the particular combination of categorical variables of the new video which are obtained in step 200.

Step 200: Obtaining Categorical Metadata Relating to the New Video.

In Step 200, categorical metadata relating to a new video is obtained by the prediction module 110. The categorical metadata comprises at least one categorical variable. Examples of categorical variables are: video content type; video content length; video content producer; video content personnel; age of video content; intended audience; geographical distribution; intended distribution channels (e.g., TV broadcast and/or digital online); advertising data, e.g., sponsorship, product placement and advertising breaks, pre-roll, mid-roll, post-roll; third-party analysis e.g., social network response; and video content production time.

The prediction module 110 may obtain the categorical metadata from the new video data store 108, for example by retrieving it from the new video data store 108 (a 'pull' operation), or receiving it from the new video data store 108 (a 'push' operation).

The metadata relating to the new video may have been obtained or determined in any suitable way. For example, in some implementations, a script will exist for a series or episode yet to be shot (i.e., a script for the 'new video'). In this case, the script can be digitally analysed to determine at least one categorical variable, and/or its associated production information, such as the production team, and/or cast, and/or locations, can be used as the at least one categorical variable. The digital analysis may incorporate one or more of computer assisted qualitative data analysis, optical character recognition, or other computational linguistics techniques.

Step 202: Obtaining an Associated Insertion Value

Figure 3:
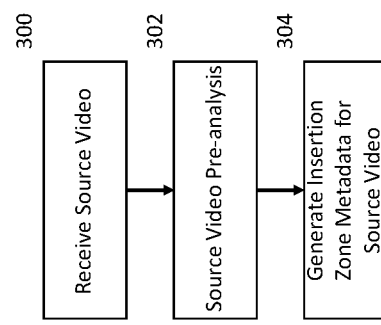
FIG. 3 is a flow chart showing a process of source video analysis according to the present disclosure.
Figure 4:
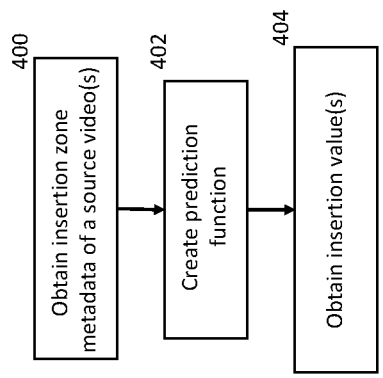
FIG. 4 is a flow chart outlining the creation of a prediction model and production of an insertion value(s) according to the present disclosure.

In Step 202, the prediction module 110 obtains an insertion value associated with each of the at least one categorical variable in the categorical metadata relating to the new video. The insertion value may be obtained by developing a model, or prediction function, using source video analysis, as described with reference to FIGS. 3 and 4. However, it will be appreciated that the processes described in respect of FIGS. 3 and 4 are non-limiting examples of the way in which insertion values may be determined. Whilst the prediction module 110 may perform the steps of FIGS. 3 and 4 (or optionally just the steps of FIG. 4, with the categorical variables and insertion zone metadata of the source video having been determined by some other entity at an earlier time, and merely looked-up or retrieved by the prediction module 110 in order to perform the process of FIG. 4), it will be appreciated that in an alternative the prediction module may simply look-up, retrieve or receive the insertion value (s), for example if they have been previously determined by some other entity.

FIG. 3 shows an example process according to an aspect of the present disclosure in which source video is analysed to develop Insertion zone metadata for the source video comprising both categorical and continuous variables in an analytical model. The metadata which is generated in this process is effectively a list of insertion zone characteristics of source video which can then relate the particular combination of categorical variables present in the source video content to object placement opportunities. A model, or prediction function, can then be developed to establish an insertion value associated with each of the categorical variables. The associated insertion value may define a correlation between the at least one categorical variable in the source video and one or more insertion zone characteristics of the source video (explained in more detail with reference to FIG. 4).

Source video is received by the source hub 102 at step 300, and in step 302 pre-analysis is performed by the source hub 102, including some or all of the pre-analysis steps which are described above. Once the pre-analysis has been performed, and the insertion zones identified, insertion zone metadata can be generated (step 304).

The insertion zone metadata comprises one or more values for each of one or more insertion zone characteristics. The insertion zone characteristics may mostly relate to continuous variables, including but not limited to length of insertion zone, size of insertion zone, duration of insertion zone, frequency of the insertions, occlusions, etc.

One particular non-limiting example of insertion zone metadata for an insertion zone of a source video is:

| Insertion zone characteristic | Value |
|---|---|
| Insertion zone size | 20% of image frame |
| Insertion zone duration | 13 seconds |
| Scene locale | Kitchen |
| Insertion zone repetition | 3 |

It will be appreciated that multiple insertion zones may be identified in the source video, such that multiple instances of one or more of the above insertion characteristics may be present in the insertion zone metadata for each identified insertion zone.

Categorical variables for the source video may also be extracted automatically from the pre-analysis pass. Semantic data can be extracted from a locale identified in the pre-analysis; face detection algorithms may identify actors who feature in the video. From analysis of the audio track of the video, information relating to genre may be identified. For example if an American comedy series might be identified from a laughter track being present in the audio, or a thriller might be identified from the presence of gunshots. Additionally, metadata might be present in the source video, including the title of the show, director, actor and other personnel information, the source of the video, date of production etc., and some or all of these can be extracted for use as categorical variables in the development of the analytic model.

The one or more categorical variables for the source video may comprise one or more of: video content type; video content length; video content producer; video content personnel; and video content production time.

FIG. 4 shows an example process of developing a model, or prediction function, using which the one or more insertion values may be obtained.

In order to generate the model, it may be preferable to use the insertion zone metadata for a plurality of examples of source video having one or more of the categorical variables in common. The categorical variable(s) that the examples of source video all have in common may be one or more of the categorical variables of the new video. Therefore, in Step 400, the categorical metadata for the new video is used to obtain relevant insertion zone metadata of a source video(s).

For example, the new video may be for a new series of episodes of a program (Program A) to be directed by a particular director (Director X). The categorical metadata of the new video may therefore comprise a categorical variables "Program: Program A" and "Director: Director X". In Step 400, insertion zone metadata for all previous episodes of that particular program directed by that particular director may be provided to prediction module 110 for developing the model.

Therefore, it could be said that the insertion zone metadata for the source video obtained in Step 400 matches the categorical metadata of the new video.

The prediction function creates metadata comprising predicted values for continuous variables relating to insertion zones for video not yet seen by the prediction module. The prediction module may then automatically review metadata stored in client preference database 112 for client users that have stored preference data which is in agreement with the predicted values obtained from the prediction function. Where a correlation or match is found between the predicted values of the continuous variables and the user preference data, a communication may be drawn up including information regarding the upcoming insertion zone opportunities and communicated to the user.

In Step 402, a prediction function is created based on the insertion zone metadata of the source video(s) obtained in Step 402. The prediction function generates an insertion value for each categorical variable of the new video and one or more insertion zone characteristic of the source video insertion zone metadata obtained in Step 400.

By way of example, analytics may be used to identify patterns within a 'season' or episodic series. For storytelling and economy reasons, a limited number of locales are used for shooting. This may be the hero's apartment, their kitchen, the street scene outside his flat, and their place of work. By careful analysis of at least some of the episodes in a series, we can determine patterns across series. Generally the series opener, and the series finale (often a double length episode) are found to be not so typical of other episodes. But within the second to last but one episodes, patterns appear of usage of locales, and therefore of potential opportunities for placements.

In a further extension to this, there may be great similarities between seasons of a given show. Further, using the present disclosure, profiles of typical genres of entertainment may be generated. For example, situation comedies about two families. We have found analytic patterns between these situation comedies, and in the light of any further information assume that one situation comedy in this genre will have a similar number of opportunities for NIVA as the other, along with a similar profile within the episodes of a season.

Other associated analytics may involve machine learning (for example, using the machine learning module 106). It is possible to determine from analysing large amounts of source videos the distribution of insertion opportunities and their correlation with categorical metadata (and hence predict values for the insertion zone characteristics of new videos, as described in more detail with respect of Step 204). By way of example, it may be desirable to analyse a large bulk of programmes deemed to be 'comedy'. In an aspect it may be worth subdividing the comedy category into sub categories, such as 'situation comedy', or 'family comedy', and analysing the insertion opportunities. This may enable an insertion value to be determined for each categorical variable to define a correlation between the categorical variable (for example 'situation comedy') and one or more insertion zone characteristic (for example, insertion zone length). Thus, if a new series is going to be made, and it is going to be a situation comedy, a model for source videos with the 'situation comedy' categorical variables may be developed, which may be used to obtain an insertion value that defines a correlation between the categorical variable 'situation comedy' and an insertion zone characteristic (such as "insertion zone size") and optionally obtain a further insertion value that defines a correlation between the categorical variable 'situation comedy' and a further insertion zone characteristic (such as "insertion zone position"), etc, etc. The insertion value(s) may be used to determine at least one predicted value for at least one insertion zone characteristic for the new series (as explained in more detail with reference to Step 204), and hence a quality score for potential insertion opportunities can be made.

Step 204: Determine Insertion Zone Metadata for New Video

In Step 204, the insertion value(s) obtained in Step 202 are used to determine insertion zone metadata of the new video. The insertion zone metadata of the new video comprises at least one predicated value of at least one corresponding insertion zone characteristic for the new video.

For example, an insertion value may define a correlation between a categorical variable of the new video and the insertion zone characteristic "insertion zone position". That insertion value is then be used in Step 204 to determine a predicted value for the insertion zone characteristic "insertion zone position" for the new video. Likewise, for each of one or more other insertion zone characteristics an associated insertion value may have been obtained in Step 202, such that a predicted value for the new video for each of those insertion zone characteristics may also be determined in Step 204.

It will be appreciated that as part of Step 202 and/or Step 204, aspects of the model may be refined through a process of comparing the output of the prediction module 110 with actual data which exist relating to the categorical and continuous variables and associated video material.

Optionally, the prediction module 110 may then automatically review metadata stored in client preference database 112 for client users that have stored preference data which is in agreement with the predicted values of insertion zone metadata for the new video obtained from the prediction function. Where a correlation or match is found between the predicted values of the continuous variables (i.e., of the insertion zone characteristics) and the user preference data, a communication may be drawn up for communicating to the prediction storage module 130 including information regarding the upcoming insertion zone opportunities.

Additionally, or alternatively, the determined insertion zone metadata may be used to determine the number of potential insertion zone opportunities in the new video (for example, average potential opportunities per episode, or per series, etc). For example, only insertion zone metadata with values meeting particular criteria (such as insertion zone duration exceeding t seconds and/or insertion zone size exceeding s % of the image frame, etc) may be classified as potential insertion zone opportunities. The criteria may be based on client criteria stored in the client preference database 112, or on any other criteria, for example set criteria that the prediction module 110 always applies.

In a further aspect of the disclosure, analytics can track production parameters and credits. It may be deduced from productions already made that situation comedies contain on average, for example, 7.2 insertion opportunities. It may also be deduced that situation comedies written by Alec Berg (writer of the 'Silicon Valley' series) contain on average, for example, 8.2 opportunities. Therefore, if a new situation comedy series is going to be produced, written by Alec Berg, the model may be used to predict a better estimate for the likely number of opportunities, and hence value, of 8.2.

It is possible to predict the insertion opportunities for new videos that do not yet exist based on combinations of historical production data from the source videos. For example, if the historical data from the source videos is that a given situation comedy such as 'Silicon Valley' has an average of 4.8 opportunities per episode, but a new director is being employed for a future series, and that director's previous programmes (perhaps not even situation comedy) are associated with high numbers of opportunities. If for example he uses long duration shots that are good for object insertion, then the number of opportunities—and also further information regarding the potential objection insertions, such as their characteristics, would be better estimated in excess of the number provided by the historical data.

Parameters on which analytics may be carried out can include, but are not limited to, one or more of: programme genre, sub-genre, length, producer, director, writers, actors, supporting actors, cameramen, production teams.

By carrying out analytics to track the parameters, through historical performances, it is possible to algorithmically determine the likely number and characteristics of object insertion opportunities that are likely to exist in a yet to be made production. A simple algorithm may be to weigh each of the above analytic parameters with determined weights to then sum and produce an overall likely 'score'. Other more complex algorithms may utilise power terms, and/or non-linear coefficients to rescale some specific parameters.

For example, where only one model, or prediction function, developed, there may be only one insertion value associated with each insertion zone characteristic. However, where two or more models are developed, there may be two or more insertion values obtained for each insertion zone characteristic, in which case determining the predicated value of an insertion zone characteristic for the new video may be based on two or more insertion values. For example, the new video may have two categorical variables (such as "Program B" and "Producer Y". One model may be developed based on source videos that all shared one of the categorical variables (such as "Program B"). This model may be used to generate one or more insertion values, each of which corresponds to a different insertion zone characteristic. A second model may be developed based on source videos that all share the other categorical variable ("Producer Y"). This model may be used to generate a second set of one or more insertion values, each of which corresponds to a different insertion zone characteristic. In this way, each insertion zone characteristic may have two associated insertion values, based on which insertion zone metadata for the new video can be determined.

Optionally, the predicted values of the insertion zone metadata of the new video may be used to determine a Visual Impact Score for a predicted insertion zone opportunity. The visual impact score may then enable the potential visual impact of a predict insertion zone opportunity in the new video to be assessed or ranked, such that the number of predicted insertion zone opportunities that achieve a desired visual impact may be determined, thereby given further information regarding the potential for object insertion opportunities in the new video. This is explained in more detail later.

Thus, it can be seen that the process represented in FIG. 2 enables insertion zone metadata for a new video to be determined, based on an analysis of relevant source video. By performing this process, when the new video is available for detailed analysis (for example, when the new video has been shot and the recording is available), only new videos that have a reasonable promise of insertion opportunities may be analysed in detail. Consequently, time and computing resources may be utilised more efficiently and effectively. For example, the associated analytics to be carried out as part of the present disclosure can work in many different ways. In some implementations, a script will exist for a series or episode yet to be shot. In this case, the script can be digitally analysed, and its associated production information, such as the production team, or cast, or locations to be used. It may be, in one example, that a whole 30 minute episode is situated inside our hero's apartment. This limits the insertion opportunities, and hence the potential worth of detailed objection insertion analysis, compared with another production, in which a 30 minute episode is shown in its script as having indoor, outdoor, city, and countryside situated scenes. It can be seen that from this example the latter series can have opportunities for a wider range of items than the former. It would be, for example, impossible to place an automobile in a living room, but may be easy in an outdoor shot. Therefore, the process of the present disclosure may readily identify that detailed object insertion analysis of the latter series may be worthwhile when that video is available, but that it may not be worthwhile for the former series. This improves the efficiency of the detailed analysis, since time and computational resources would not be wasted on the former series.

In one implementation of the above described process, we can apply machine learning on the whole or a subdivision of the historical data that we have (for example, using the machine learning module 106). Once the training phase has been completed on this subdivision, it is then asked to produce estimates for combinations of parameters it has not seen, but exist in the remaining part of the historical data. This can then 'calibrate' the learning, as if there is good correlation between calculated estimates for material not in the training, and the real values for this material then the training has been successful.

Let us consider ways that 'Machine Learning' can be applied to our problem:

Firstly let us define the terminology that we will use

A shot is a contiguous segment of video. We can think of it as a time interval [a, b] in a video.

A scene is a collection of video shots.

An 'avail' shot is a shot that is suitable for an object insertion opportunity.

A poster frame is a video frame that best summarises the 'avail' shot.

A blue box is a specific image area in a poster frame, which will contain the inserted object.

The valuation function $f$ of a given object insertion opportunity depends on several variables. These variables can be categorical or continuous. A categorical variable is one for which a value exists, but which varies among a set of discrete outcomes. For example, the variable "genre" may be "situation comedy", "drama", "entertainment" etc. It will not be a numerical value which is somewhere between these discrete values. Likewise the categorical variable for the category "Actor" will be defined as "Peter Dinklage" or "Julia Louis-Dreyfus". A continuous variable relates in general terms to the metadata which is generated relating to the insertion zone itself, described further below.

Considering categorical variables: Examples of categorical variables on which $f$ depends are:

The media family, e.g., 'Hannibal' indexed by $m=1, \ldots, M$;

The brand category indexed by $b=1, \ldots, B$;

The age of the media family t in years (i.e., the prediction function $f$ of a given opportunity may depend of the date and age of the media family.)

The existence of categorical variables having discrete values may make it hard to estimate a unique prediction function $f$. Rather, it may be easier to estimate a family of prediction functions $f_{m,b}$ indexed by m, b. Each valuation function $f_{m,b}$ is a time series that depends on several continuous variables which are enumerated in the next paragraph.

Considering the Continuous Variables, the most prominent on which $f$ depends are relevant to perform the prediction of a specific object insertion opportunity for a given video shot, i.e., a video interval of an episode of a media family.

They may include at least one of, but are not limited to:

The position and size (x, y, h, w) of the insertion zone: the larger and the more central the blue box is, the higher the impact of the inserted object.

The scene length, i.e. d, the temporal duration in seconds of the specific inserted object in the video;

The integration metrics, m, comprising at least one of:

Interactivity value: typically we want to replace an existing object, e.g., a smartphone, in the scene and with another object. The more a character interacts with the advertised product, the more likely the audience's attention will be drawn to the inserted product, hence a higher value of the inserted product.

Hero status value: if the object is placed in an image area where it blends into the background, chances are that the audience will not pay attention to the inserted object. However if the opposite is true, the more likely it is that the audience will notice it.

Proximity of the insertion zone with respect to the action. Objects closer to the action may have a higher impact.

Repetition of the object. The higher the number of repeated objects is, the higher the impact.

Orientation, the more frontal the object is placed, the higher the impact.

More or fewer categorical variables could be used, as will be appreciated by the skilled person. An affinity score s with the current shot, i.e., which quantifies the affinity between the object category and the locale and existing relevant surfaces in the video shot may also developed.

We can now carry out statistical modelling. It is important to note that the measured quality scores may be noisy.

To make predictions with these variables, we can make the following assumptions.

Either these variables follow a stable distribution per episode, which we can model via stochastic processes, in particular Gaussian processes (cf. *Gaussian Processes for Machine Learning, Rassmussen and Wiliams*, 2006). In this case, these variables are now random variables and can be denoted in capital letters X, Y, H, W, Δ, M, S and the lowercase letters then denote an identified sample data point. As we said it earlier, since the sampled points are noisy, thus $X=X'+\sigma$ where X' is the true random variable that we want to observe and σ is the random variable that models the measurement noise.

Or these variables vary slowly over the episodes and we can model them by a stochastic process. Then $X_t=X'_t+\sigma_t$ and so on.

We can also define Ground Truth Validation Data. For a given media family m and for a given year t, we can also store the following data:

The number of opportunities per episodes O.

The inserted object quality score per episodes A: it quantifies the quality of a given object insertion opportunity.

The abovementioned variables are stored over time and we may like to estimate or predict the prediction function from different point of views. In the following, we assume the data is sufficiently large and the behaviour of the inserted object is nonlinear, otherwise it may suffice to do a linear regression. We may standardise variables to ensure the numerical stability in the estimation problem. Let us consider a first example:—

For a given media family m, and a given brand category b, and a given time t, can we predict the inserted object quality score per episodes $A_{m,b,t}$ from the history $A_{m,b,1}$, $A_{m,b,2}$, ..., $A_{m,b,t-1}$. Note here that we don't try to model the variable dependencies listed above. This is a time series prediction problem.

If we still do not have enough data, it may be useful to cluster media families by genre to augment the data at the expense of being less precise in the prediction in the time series.

Now let us consider a second example. Can we learn the variable dependencies in general between the inserted object quality score and the other variables mentioned above? Specifically can we learn a function $f$ such that $A_{m,b}=f(X,Y,H,W,\Delta,M,S)$?

We can assume the variable dependencies are relatively invariant by genre. If we do want to model the temporal dependencies. Let us first forget the fact the variables are random variables. Then we can sketch the following model:

$$\overline{A}_{m,b,t}=f_t((\overline{x}_t,\overline{y}_t,\overline{h}_t,\overline{w}_t),\delta_t,\overline{m}_t,\overline{s}_t)+\sigma_t \quad (1)$$

$$(\overline{x}_{t+1},\overline{y}_{t+1},\overline{h}_{t+1},\overline{w}_{t+1})=g_t^1(\overline{x}_{1:t},\overline{y}_{1:t},\overline{h}_{1:t},\overline{w}_{1:t})+\sigma_t \quad (2)$$

$$\delta_t=g_t^2(\delta_{1:t})+\sigma_t^2 \quad (3)$$

$$\overline{m}_{t+1}=g_t^3(\overline{m}_{1:t})+\sigma_t^3 \quad (4)$$

$$\overline{s}_{t+1}=g_t^4(\overline{s}_{1:t})+\sigma_t^4 \quad (5)$$

Where the bar notation denotes the temporal mean quality score for a given period of time, say a month. For example, for a media family m being broadcast weekly, then, the average quality score per month of variable x is $$\overline{x}_t = \frac{1}{4}\sum_{t'=0}^{4} x_{t'}$$

Then the goal is to estimate the argmax of the following conditional probability distribution at each time:

$$p(A_{m,b,t}|x_t,y_t,h_t,w_t,\delta_t,m_t,s_t)$$

which can be classically modelled as a Bayesian mixture model (e.g. GMM) and estimated via MCMC.

The variable $A_{m,b,t}$ depends on random variables $x_t$, $y_t$, $h_t$, $w_t$, $m_t$, $s_t$ that are modelled by Gaussian processes:

$$p((x_{t+1},y_{t+1},h_{t+1},w_{t+1})|\{(x_s,y_s,h_s,w_s)\}_s^{t=1})$$

$$p(m_{t+1})|m_{1:t})$$

$$p(\delta_{t+1})|\delta_{1:t})$$

$$p(s_{t+1})|s_{1:t})$$

Optionally, we may increase the inserted object quality score if a media family is very popular or some other external metric. For example, we can measure the popularity value Pt of a media by:

The number of views in YouTube (e.g daily) as an indication of popularity.

The number of daily comments in social media.

The number of likes in Facebook in a given time frame.

The rate of tweets mentioning anything related to the media family.

The number of hashtags in Instagram.

A Gaussian process is a robust machine learning regression technique which not only estimates the best values $x_{t+1}$, $y_{t+1}$, $h_{t+1}$, $w_{t+1}$, $m_{t+1}$, $s_{t+1}$, but also estimates the uncertainty of each estimate, i.e., the error bar: $\text{var}((x_{t+1}, y_{t+1}, h_{t+1}, w_{t+1}))$, $\text{var}(m_{t+1})$, $\text{var}(s_{t+1})$. A wide error bar indicates a potentially large error in prediction, whilst a narrow error bar can indicate a small error. The size of error can be determined by the analytics. For cases where the predicted score, based on the works parameters, such as genre, cast and producer, is similar to the actual score or value, the error is low, and shown with a small bar, determined by the difference between actual and predicted scores or values. For cases where the error is large, a larger error bar is shown which is determined by the difference again between the actual and predicted scores. By way of examples, we would expect the error prediction in quality score to be large if all we know about a yet unmade production is that it is a 'comedy'. By comparison, we would expect small errors if we know that the work is a new series of 'Silicon Valley', with the same cast, director, and production crew as that of a previous series on which we have done detailed analysis.

We have above described a process which enables the evaluation of episodic material, in the form of series or season's episodes, which enables the prediction of the qualities of placement opportunities in video material that for one reason or another is unseen or unavailable. The above techniques may be used in combination for a more accurate analysis. For example, a series may be announced, of a given genre of programme—a detective thriller series. Based purely on this, initial estimates on the number of opportunities for object insertion can be determined, from 'other' detective thriller series. A pilot episode may become available for analysis, and although we believe pilot episodes to be 'less' typical than other episodes, it may be possible to update the predictions of the number of object insertion opportunities, over the forthcoming (and as yet unmade or unseen) episodes. This is likely to be more accurate estimates than the initial estimates. At a later stage, episodes 2 to 5 may be available for analysis. This is likely to result in even more accurate estimates for the object insertion opportunities for the remaining episodes of the series. Eventually, at the end of the first season, it may be announced that a second season is being commissioned. Based on the first season, and the distribution of object insertion opportunities across locales and episodes, it is then possible to predict the number of opportunities in the second season.

In the context of a content delivery platform, it is also important to be able to predict the characteristics of a placement to be able to present opportunities to client users.

In certain aspects, a video impact score is developed to assess an insertion zones potential impact on viewers of the video. The Video Impact Score (VIS) is a multiplier to the quality score of an object insertion opportunity value to account for the highly variable nature of brand embedding into video content. VIS is a number lying on a scale, for example between 0 and approximately 2 (although the scale may be of any size and granularity). In reality VIS may not be allowed to be less than 1 and is generally between 1 and 2. The VIS may calculated based on the predicted value(s) of the insertion zone metadata of the new video, for example by combining an Exposure Score and a Context Score (although any other suitable function for determining the VIS using one or more predicted value of insertion zone metadata for the new video may alternatively be used). These two scores are a weighted combination of a number of parameters including Brand relevance, Duration, Hero Status, Proximity, Amplification, as defined below. Consider the following:

Calculating Video Impact Score$^{BETA}$

VIS=ES+CS

ES=Exposure Score

CS=Context Score

Calculating Exposure Score $$ES = W_D f(D) + W_S f(S) + W_A A$$

$$D = \text{Qualifying Exposure Duration}$$

$$S = \text{Average Exposure Size}$$

$$A = \text{Amplification} = \begin{cases} 0, & !\text{amplified} \\ 1, & \text{amplified} \end{cases}$$

$$f(D) = \text{Duration valuation function}$$

$$f(S) = \text{Size valuation function}$$

$$W = \text{Weight}$$

The context score is a weighted combination of metrics specific to embedding brands into video content, focused on providing a valuation depending on the fit between the brand and the content.

The Context Score may be between 0 and approximately 2 (although the scale may be of any size and granularity). In campaign execution, values below 1 will not be allowed through choice of content and ad location.

The primary term is the Brand Relevance, which is used to determine whether the brand fits the context (e.g. Vodka in a bar). If there is no Brand Relevance, then the score is 0, and the CS will be 0. When we have Brand Relevance, the Context Score is 1 or above, with the rest of the terms supplying boosts in value.

The Context Score may be carried out as follows:

$$CS = \begin{cases} 0, & B = 0 \\ B + W_H H + W_P P, & B = 1 \end{cases}$$

$$B = \text{Brand Relevance} = \begin{cases} 0, & !\text{match} \\ 1, & \text{match} \end{cases}$$

$$H = \text{Hero Status} = \begin{cases} 0, & !\text{match} \\ 1, & \text{match} \end{cases}$$

$$P = \text{Proximity} = \begin{cases} 0, & !\text{touching} \\ 1, & \text{touching} \end{cases}$$

Thus, it will be appreciated that a VIS may be determined for a predicted insertion zone opportunity in a new video based on at least some of the predicted values of the insertion zone metadata for that predicted insertion zone opportunity. The VIS for a predicted insertion zone opportunity may be a useful technique for ranking predicted insertion zone opportunities, or filtering poorer predicted insertion zone opportunities such that the number of predicted insertion zone opportunities for a new video that meet a particular video impact requirement (for example, that have a VIS greater than a threshold value) may be readily identified and the potential suitability for object insertion opportunities for the new video straightforwardly appreciated.

The skilled person will readily appreciate that various alterations or modifications may be made to the above described aspects of the disclosure without departing from the scope of the disclosure. For example, the system 100 is represented as a set of interconnected modules/entities. However, the functionality of any two or more of the modules/entities may be performed by a single module, for example the functionality of the prediction module 110, machine learning module 106 and source hub 102 may be implemented by a single entity or module. Likewise, any one or more of the modules/entities represented in FIG. 1 may be implemented by two or more interconnected modules or entities. For example, the functionality of the prediction module 110 may be implemented as a system of interconnected entities that are configured to together perform the functionality of the prediction module 110. It will be appreciated that the system 100 represented in FIG. 1 is merely one non-limiting example of a hardware configuration adapted to perform the process described with reference to FIG. 2. For example, the system 100 may alternatively not comprise the machine learning module 106, and the prediction module 110 may instead perform the process described with reference to FIG. 2 without the use of machine learning.

The aspects of the disclosure described above may be implemented by software, hardware, or a combination of software and hardware. For example, the functionality of the prediction module 110 may be implemented by software comprising computer readable code, which when executed on the processor of any electronic device, performs the functionality described above. The software may be stored on any suitable computer readable medium, for example a non-transitory computer-readable medium, such as read-only memory, random access memory, CD-ROMs, DVDs, Blue-rays, magnetic tape, hard disk drives, solid state drives and optical drives. The computer-readable medium may be distributed over network-coupled computer systems so that the computer readable instructions are stored and executed in a distributed way. Alternatively, the functionality of the prediction module 110 may be implemented by an electronic device that is configured to perform that functionality, for example by virtue of programmable logic, such as an FPGA.

The invention claimed is:

1. A computer implemented method comprising:
  obtaining, from data associated with a new video, at least one categorical variable related to the new video; and
  determining for the new video, a predicted value of an insertion zone characteristic using the at least one categorical variable and at least one prediction model that defines a correlation between one or more categorical variables and one or more insertion zone characteristics, wherein each prediction model is based on one or more pre-existing videos, each having at least one associated categorical variable and insertion zone metadata describing at least one insertion zone present in a corresponding pre-existing video.

2. The method of claim 1, wherein determining the predicted value of the insertion zone characteristic comprises creating the at least one prediction model using the one or more pre-existing videos.

3. The method of claim 2, wherein creating each of the one or more prediction models comprises:
  identifying one or more pre-existing videos that have a particular categorical variable in common with the new video; and
  creating the prediction function using the insertion zone metadata associated with the identified one or more pre-existing videos, so as to define a correlation between insertion zone metadata and the particular categorical variable.

4. The method of claim 3, further comprising identifying at least one categorical variable for pre-existing videos using one or more digital analysis technique from: facial recognition, optical character recognition, computer vision techniques, manual annotation, convolutional neural network processing.

5. The method of claim 1, wherein the prediction model comprises a machine learning algorithm trained by categorical variables and insertion zone metadata associated with one or more pre-existing videos.

6. The method of claim 1, wherein the at least one categorical variable related to the new video comprises at least one of: numerical data related to the new video; or textual data related to the new video.

7. The method of claim 1, wherein the at least one categorical variable related to the new video comprises one or more of:
  video content type;
  video content length;
  video content producer;
  video content personnel;
  age of video content;
  intended audience;
  geographical distribution;
  intended distribution channels;
  advertising data;
  third-party analysis;
  video content production time; and
  video content genre.

8. The method of claim 1, wherein the insertion zone characteristic comprises one or more of:
  insertion zone position;
  insertion zone size;
  insertion zone duration;
  scene locale;
  insertion zone character interactivity;
  insertion zone attentional value;
  insertion zone proximity;
  insertion zone orientation;
  insertion zone blur;
  insertion zone hero status;
  insertion zone repetition; and
  number of insertion opportunities.

9. The method of claim 1 further comprising:
  comparing the predicted value of the insertion zone characteristic against stored preference data of a client; and
  in response to the predicted value of the insertion zone characteristic meeting at least one criterion defined in the preference data, recording that the new video is suitable for the client.

10. The method of claim 9, wherein recording that the new video is suitable for the client comprises drawing up a communication for communicating information relating to the predicted insertion zone characteristic.

11. A non-transitory computer-readable medium having computer executable instructions stored thereon, which in response to being executed by a computing device cause a system to perform operations, the operations comprising:
obtaining, from data associated with a new video, at least one categorical variable related to the new video; and
determining for the new video, a predicted value of an insertion zone characteristic using the at least one categorical variable and at least one prediction model that defines a correlation between one or more categorical variables and one or more insertion zone characteristics, wherein each prediction model is based on one or more pre-existing videos, each having at least one associated categorical variable and insertion zone metadata describing at least one insertion zone present in the pre-existing video.

12. A computer implemented method of creating a prediction model describing a correlation between metadata of a video and one or more insertion zone characteristics of the video, the method comprising:
obtaining a corpus of videos, each video comprising categorical metadata and insertion zone metadata, wherein the categorical metadata comprises at least one categorical variable, and wherein the insertion zone metadata describes at least one characteristic of an insertion zone in image content of the video, into which an object may be digitally inserted; and
identifying correlations between the categorical metadata and the one or more insertion zone characteristics in the corpus of videos.

13. The method of claim 12, wherein the corpus of videos have at least one categorical variable in common.

14. The method of claim 12, wherein identifying correlations between the categorical metadata and the one or more insertion zone characteristics in the corpus of videos comprises:
training a machine learning module to identify correlations between the categorical metadata and the one or more insertion zone characteristics in the corpus of videos.

15. The method of claim 12, further comprising:
determining the categorical metadata for at least some of the corpus of videos using one or more digital analysis technique from: facial recognition, optical character recognition, computer vision techniques, manual annotation, convolutional neural network processing.

16. A system suitable for use in predicting insertion zone characteristics of a video, the system comprising:
a prediction module comprising a prediction function defining a correlation between categorical variables and insertion zone metadata, wherein the prediction model is based on a corpus of pre-existing videos that each comprise categorical metadata and insertion zone metadata, wherein the categorical metadata associated with each pre-existing video comprises at least one categorical variable, and wherein the insertion zone metadata associated with each pre-existing video describes at least one characteristic of an insertion zone in image content of the pre-existing video, into which an object may be digitally inserted.

17. The system of claim 16, wherein the prediction module is a machine learning module.

18. The system of claim 16, wherein the prediction module is configured to:
receive at least one categorical variable relating to a new video; and
determine, using the production function and the at least one categorical variable, an insertion value, wherein the insertion value is indicative of a correlation between the categorical variable and one or more insertion zone characteristics.

19. The system of claim 18, wherein the prediction module is further configured to:
output the insertion value for further processing to determine predicted insertion zone metadata for the new video.

20. The system of claim 18, wherein the prediction module is configured to:
determine predicted insertion zone metadata for the new video based at least in part on the insertion value.

* * * * *

UNITED STATES PATENT AND TRADEMARK OFFICE
CERTIFICATE OF CORRECTION

PATENT NO. : 10,909,383 B2
APPLICATION NO. : 16/814802
DATED : February 2, 2021
INVENTOR(S) : Tim Harris, Philip McLauchlan and David Ok Page 1 of 1

It is certified that error appears in the above-identified patent and that said Letters Patent is hereby corrected as shown below:

In the Specification

Column 1, Line 36, delete "scene" and insert -- scenes --, therefore.

Column 1, Line 52, delete "technique" and insert -- techniques --, therefore.

Column 2, Line 29, delete "is".

Column 2, Line 33, delete "objection" and insert -- object --, therefore.

Column 4, Line 18, between the words "or" and "insertion" insert -- more --, therefore.

Column 5, Line 8, delete "device" and insert -- devices --, therefore.

Column 6, Line 8, delete "an" and insert -- a --, therefore.

Column 12, Line 22, between the words "then" and "be" insert -- to --, therefore.

Column 19, Line 26, delete "to together" and insert -- together to --, therefore.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*